United States Patent
Aoki et al.

(10) Patent No.: US 7,206,957 B2
(45) Date of Patent: Apr. 17, 2007

(54) CLOCK DISTRIBUTION CIRCUIT

(75) Inventors: Yoshitaka Aoki, Kanagawa (JP);
Nobuo Ida, Kanagawa (JP); Rumi Hikiba, Kanagawa (JP); Yoshinobu Nakajima, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 329 days.

(21) Appl. No.: 10/127,297

(22) Filed: Apr. 22, 2002

(65) Prior Publication Data
US 2002/0180502 A1    Dec. 5, 2002

(30) Foreign Application Priority Data
Apr. 26, 2001  (JP) ............... 2001-129187

(51) Int. Cl.
*G06F 1/04*    (2006.01)
*G06F 1/10*    (2006.01)

(52) U.S. Cl. .................... 713/500; 713/400

(58) Field of Classification Search ........... 710/100; 712/35; 713/400, 322, 500; 714/741
See application file for complete search history.

(56) References Cited

U.S. PATENT DOCUMENTS 5,396,599 A * 3/1995 Cobbs et al. ............. 710/100
5,774,699 A * 6/1998 Nagae ...................... 713/400
6,211,715 B1 * 4/2001 Terauchi .................. 327/295
6,249,893 B1 * 6/2001 Rajsuman et al. ......... 714/741
6,532,530 B1 * 3/2003 Kim et al. .................. 712/35
6,564,329 B1 * 5/2003 Cheung et al. ............ 713/322
6,617,893 B1 * 9/2003 Born et al. ................ 327/115

FOREIGN PATENT DOCUMENTS

| JP | 07-105173 | 4/1995 |
| JP | 07-295956 | 11/1995 |
| JP | 09-128107 | 5/1997 |
| JP | 11-272644 | 10/1999 |
| JP | 2000-100952 | 4/2000 |
| JP | 2000-165234 | 6/2000 |
| JP | 2000-243939 | 9/2000 |
| JP | 2000-311943 | 11/2000 |
| JP | 2001-022692 | 1/2001 |

* cited by examiner

*Primary Examiner*—Thomas Lee
*Assistant Examiner*—Ji H. Bae
(74) *Attorney, Agent, or Firm*—Katten Muchin Rosenman LLP

(57) ABSTRACT

A user circuit unit is configured by a gate array, a PLL circuit is configured in a microprocessor macro unit, a clock frequency output from the PLL circuit in the microprocessor macro unit is directly distributed to a user circuit unit (CLK 3), and the clock frequency distributed to the user circuit unit is distributed to the microprocessor macro unit through a frequency divider configured by the user circuit unit.

6 Claims, 10 Drawing Sheets

CLOCK DISTRIBUTION CIRCUIT

BACKGROUND OF THE INVENTION

1. Field of the Invention

The present invention relates to a clock distribution circuit, and more specifically to a clock distribution circuit for use in a system-on-chip field in a gate array system (hereinafter referred to as an ASIC) obtained by combining a microprocessor macro including a CPU core and its peripheral circuit with a user circuit.

2. Description of the Prior Art

In an ASIC (application specific integrated circuits) obtained by combining a microprocessor macro including a CPU core and its peripheral circuit with a user circuit, it is well known that products designed by a cell-based system have been popularly marketed in a large volume project.

In the recent market, there is an increasing demand for a product in a microprocessor-macro-based platform design system formed by a CPU core and its peripheral circuit as a product in a small volume project. Especially, it is also well known that an easily designed product of a short TAT and a low cost by reuse of an IP (intellectual property) core is demanded.

As a product in the small volume project, An ASIC designed by a gate array system (a first prior art) obtained by combining a microprocessor macro including a CPU core and its peripheral circuit with a user circuit has also become popular in the market. An ASIC in the above mentioned first prior art is disclosed by, for example, Japanese Patent Laid-Open No. 2000-100952.

In the ASIC in the first prior art, a control circuit built in a CPU macrocell controls the timing or a sequence for smooth transmission/reception of a signal. Using the CPU macrocell having the above mentioned control circuit, a user of the ASIC of the first prior art can more easily control the CPU.

Furthermore, there is also a demand in the market for operating a microprocessor macro unit and a user circuit unit at different clock frequencies.

Therefore, in response to the request, an ASIC in a gate array system in a second prior art obtained by combining a microprocessor macro including a CPU core and its peripheral circuit with a user circuit is disclosed by, for example, Japanese Patent Laid-Open No. 7-295956 or Japanese Patent Laid-Open No. 11-272644.

Furthermore, an ASIC by a cell-based system with a similar configuration corresponding to the above mentioned demand is also well known.

A microprocessor including a CPU core unit and its peripheral circuit unit incorporated into the ASIC in the above mentioned second prior art has a configuration in which a user-specified clock frequency for operation of the microprocessor is distributed into the CPU core unit and the peripheral circuit unit.

Additionally, an ASIC of a cell-based system in a third prior art having a configuration in which a part (the CPU core unit or the peripheral circuit unit) of the clock frequency of the microprocessor macro unit formed by a CPU core and its peripheral circuit is distributed to the user circuit unit is also well known.

In a case where the user circuit unit could be requested to be operating at a clock frequency higher than the clock frequency of the microprocessor macro unit formed by a CPU core and its peripheral circuit, the user circuit unit includes a PLL (phase locked loop) circuit, and realizes a high-speed clock frequency.

However, since the ASIC in the above mentioned conventional gate array system has a user circuit unit in a gate array configuration, the chip size and the size of the user circuit unit are predetermined. In a case where a user requests to operate the user circuit unit at a clock frequency higher than the clock frequency of the microprocessor macro unit including a CPU core and its peripheral circuit by using the ASIC in the above mentioned conventional gate array system, there arises the problem that a user-requested circuit cannot be realized by a user circuit unit if the PLL (phase locked loop) circuit is incorporated into the user circuit unit configured by a gate array.

That is, when a PLL circuit is incorporated into a user circuit unit, a large number of the gates of the PLL circuit reduce the number of user circuit units available by the user, thereby disabling a user-requested user circuit to be realized by the user circuit unit.

SUMMARY OF THE INVENTION

The present invention has been achieved to solve the above mentioned problems, and aims at providing a clock distribution circuit of the ASIC designed by the gate array system obtained by combining a microprocessor macro unit with a user circuit.

The clock distribution circuit of a system-on-chip (ASIC) including a microprocessor macro unit and a user circuit unit according to the present invention includes: the microprocessor macro unit for generating a first clock signal having a first frequency required for operation of the user circuit unit and providing the signal for the user circuit unit; and a frequency control unit for generating a second clock signal required for operation of the microprocessor macro unit by frequency-converting the above mentioned first clock signal into a second frequency different from the first frequency, and providing the signal for the microprocessor macro unit.

Additionally, the clock distribution circuit of a system-on-chip (ASIC) including a microprocessor macro unit and a user circuit unit according to the present invention includes: the microprocessor macro unit for generating a first clock signal having a first frequency required for operation of the user circuit unit and providing the signal for the user circuit unit; and a frequency control unit for generating a second clock signal required for operation of the microprocessor macro unit by frequency-converting the above mentioned first clock signal into a second frequency different from the first frequency, and providing the signal for the microprocessor macro unit. With the configuration, when the frequency of the first clock signal used in the user circuit unit is higher than the frequency of the second clock signal, the frequency of the clock signal of the user circuit unit is selected as the frequency of the first clock signal, the first clock signal having the first frequency output from the clock generation circuit is provided for the clock frequency control unit of the user circuit unit, the first clock signal having the first frequency provided to the user circuit unit is frequency-divided by the clock frequency control unit configured by the user circuit unit, and the second clock signal is provided for the microprocessor macro unit.

Furthermore, the clock distribution circuit according to the present invention can be realized by the following various preferable embodiments. That is, the microprocessor macro unit of the clock distribution circuit according to the present invention includes a CPU core of a microprocessor and a peripheral circuit unit of the microprocessor. The peripheral circuit unit of the microprocessor includes the clock generation circuit.

The CPU core of the microprocessor of the clock distribution circuit according to the present invention is a RISC type microprocessor.

The clock generation circuit of the clock distribution circuit according to the present invention is configured by a PLL circuit.

The clock frequency control unit of the clock distribution circuit according to the present invention is configured by a frequency divider for dividing the clock frequency output by the clock generation circuit.

The clock frequency control unit of the clock distribution circuit according to the present invention is configured by a first frequency divider for dividing the first clock signal output by the clock generation circuit, and a second frequency divider for dividing the clock frequency output by the first frequency divider.

The frequency division ratio of the first frequency divider of the clock distribution circuit according to the present invention is equal to the frequency division ratio of the second frequency divider.

DETAILED DESCRIPTION OF THE PREFERRED EMBODIMENTS

Figure 1:
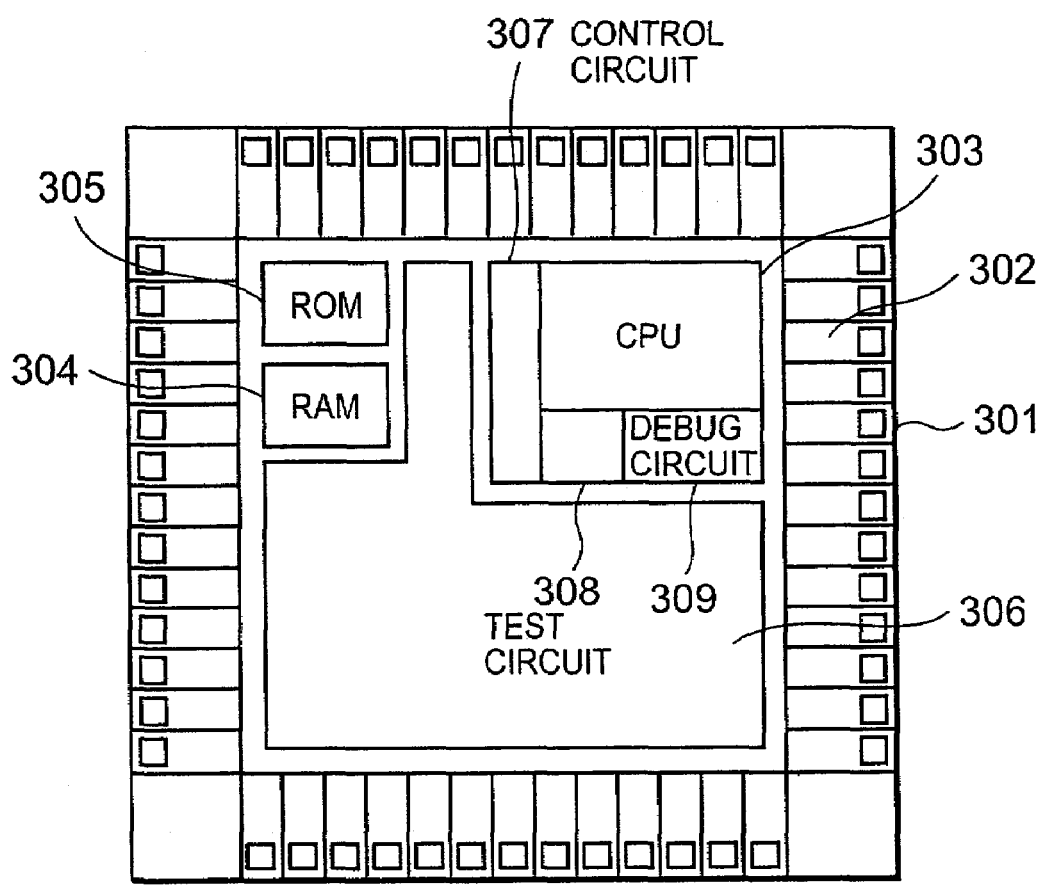
FIG. 1 is a block diagram of a conventional ASIC.

Described below will be a conventional ASIC to more clearly understand the present invention. An ASIC in a first prior art will be first described below. FIG. 1 shows a configuration of the ASIC in the first prior art. In the ASIC in the first prior art shown in FIG. 1, a CPU, RAM, and ROM are incorporated as macrocells into an embedded array.

By referring to FIG. 1, an embedded array 301 of the ASIC in the first prior art comprises I/O cells 302 provided around, a CPU 303 incorporated as a macrocell, RAM 304 and ROM 305 incorporated as macrocells, and a user circuit 306 in which basic cells are laid over a matrix.

Additionally, the CPU macrocell 303 of the ASIC in the first prior art forms one macrocell by incorporating a control circuit 307 for controlling the CPU, a test circuit 308, and a debug circuit 309 into the body of the CPU.

The user circuit in the user circuit area 306 is not connected directly to the CPU 303, but is connected to the control circuit 307 for controlling the CPU 303, thereby more easily operating the CPU 303.

The important operations performed by the CPU 303 can be data reading/writing operations using the memory inside or outside the chip, and using the peripheral circuit inside or outside the chip.

For example, assume that the ROM 305 stores a program code to be executed by the CPU microcell 303. In this case, the CPU microcell 303 issues to the ROM 305 a control signal such as an address signal, a read signal, etc. to read an instruction code output from the ROM 305 and execute the instruction.

The control circuit 307 built in the CPU microcell 303 controls the timing and sequence for smooth transmission/reception of these signals. Using the control circuit by the CPU microcell 303, the user can more easily control the CPU.

The ASIC in a second prior art will be described below by referring to FIG. 2.

Figure 2A:
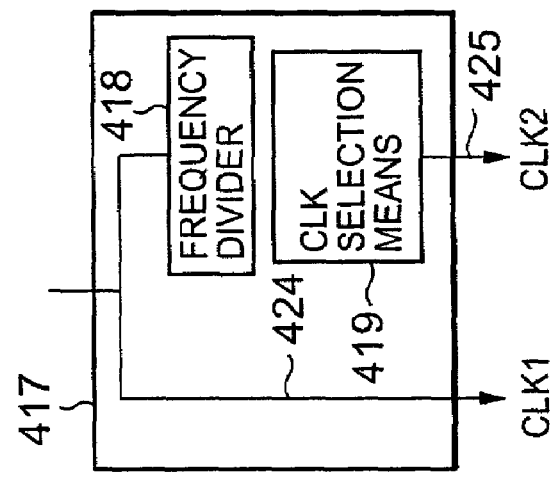
FIGS. 2A and 2B are block diagrams of conventional clock distribution circuits.
Figure 2B:
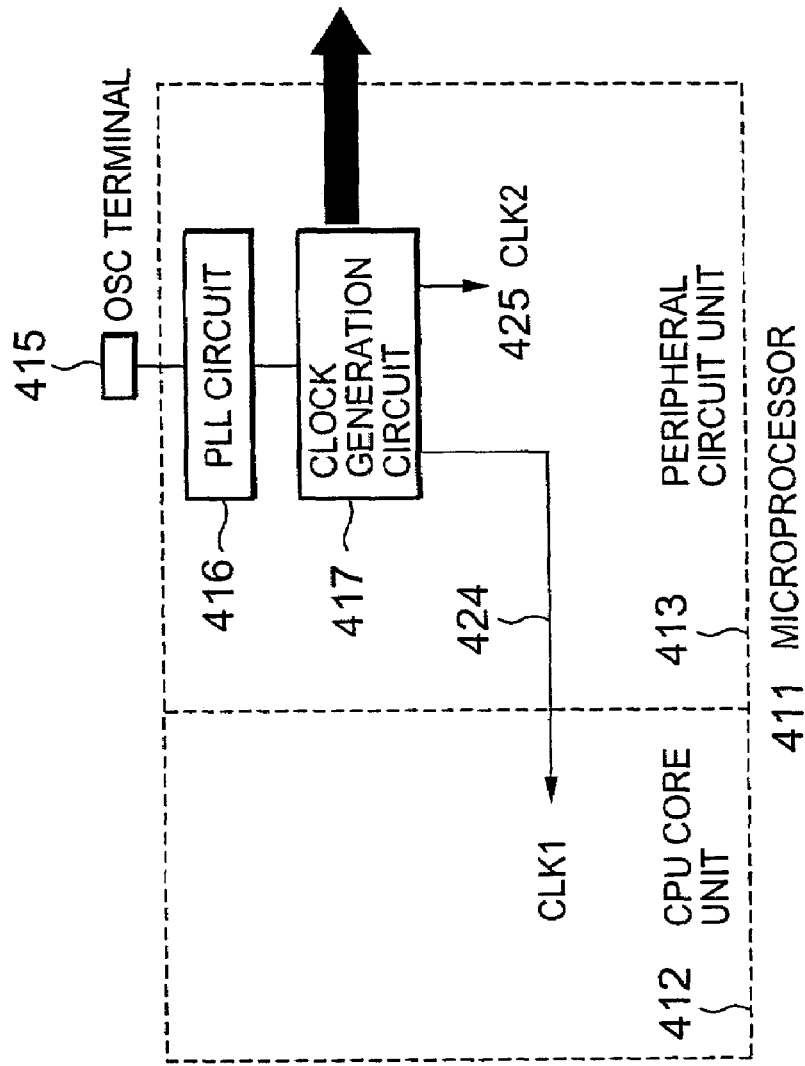

By referring to FIG. 2, a clock distribution circuit in a microprocessor 411 comprising a CPU core unit 412 and a peripheral circuit unit 413 is used in the ASIC in the second prior art, and generates a clock CLK 1 (424) for quick operation of the CPU core unit 412 using a clock (CLK) generation circuit 417 in the microprocessor 411 and a clock CLK 2 (425) for slow operation of the peripheral circuit unit 413, and distributes them to the CPU core unit 412 and the peripheral circuit unit 413 respectively.

That is, the microprocessor 411 comprising the CPU core unit 412 and the peripheral circuit unit 413 has the configuration in which the user-desired clock frequency for operating the microprocessor 411 is distributed to the CPU core unit 412 and the peripheral circuit unit 413.

Figure 3:
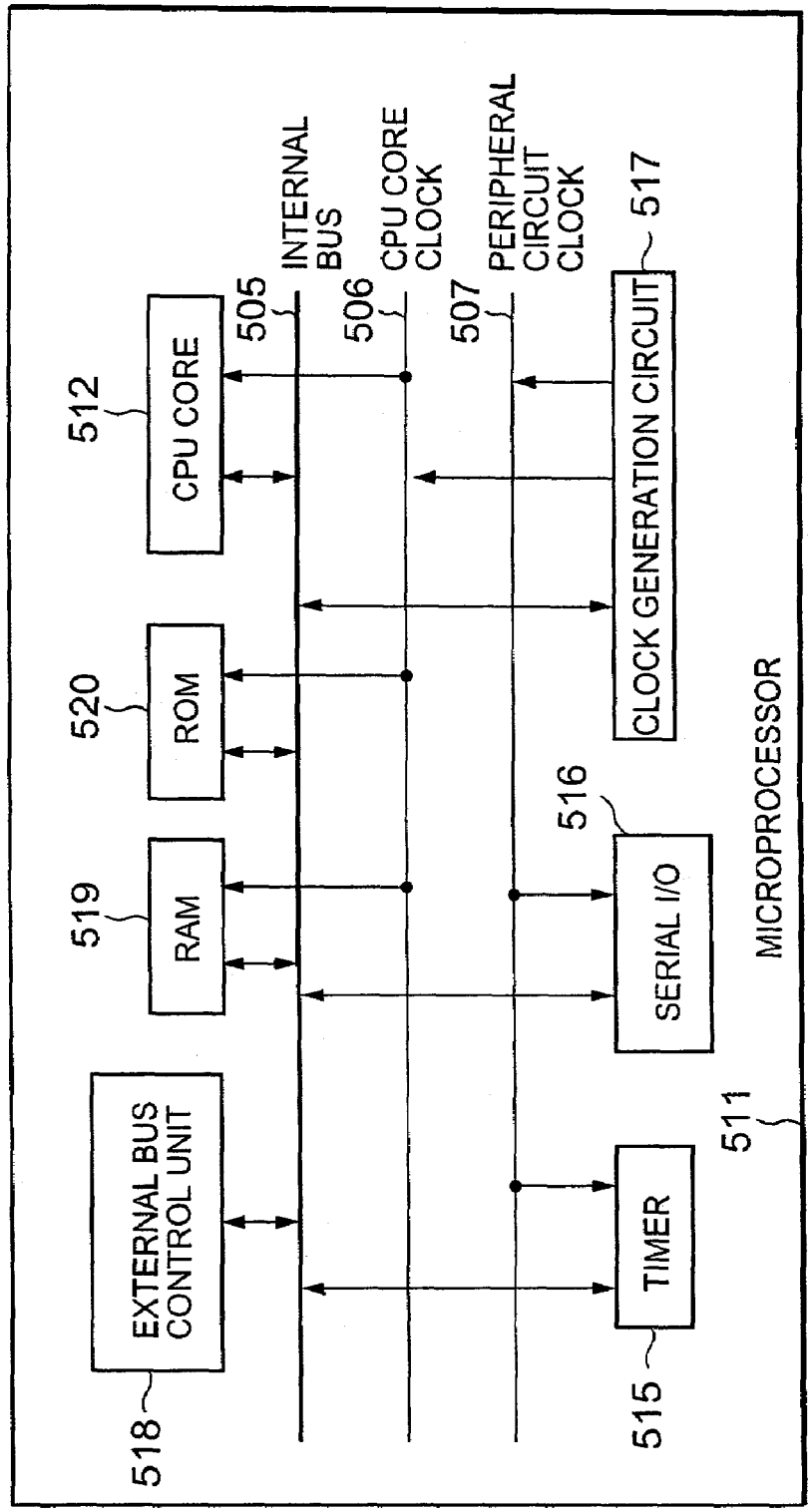
FIG. 3 is a block diagram of a conventional microprocessor.

Described below will be the ASIC in a third prior art. That is, a microprocessor 511 is shown in FIG. 3 based on the bus configuration.

Thus, in the cell-based ASIC in the third prior art obtained by combining a microprocessor comprising a CPU core unit and its peripheral circuit unit with a user circuit, a part of the clock frequency (the CPU core unit or the peripheral circuit unit) of the microprocessor macro unit comprising the CPU core and its peripheral circuit is distributed to the user circuit unit.

When the user circuit unit is operating at a clock frequency higher than the clock frequency of the microprocessor macro unit formed by a CPU core and its peripheral circuit, the user circuit unit includes a PLL circuit, and realizes a high-speed clock frequency.

Figure 8:
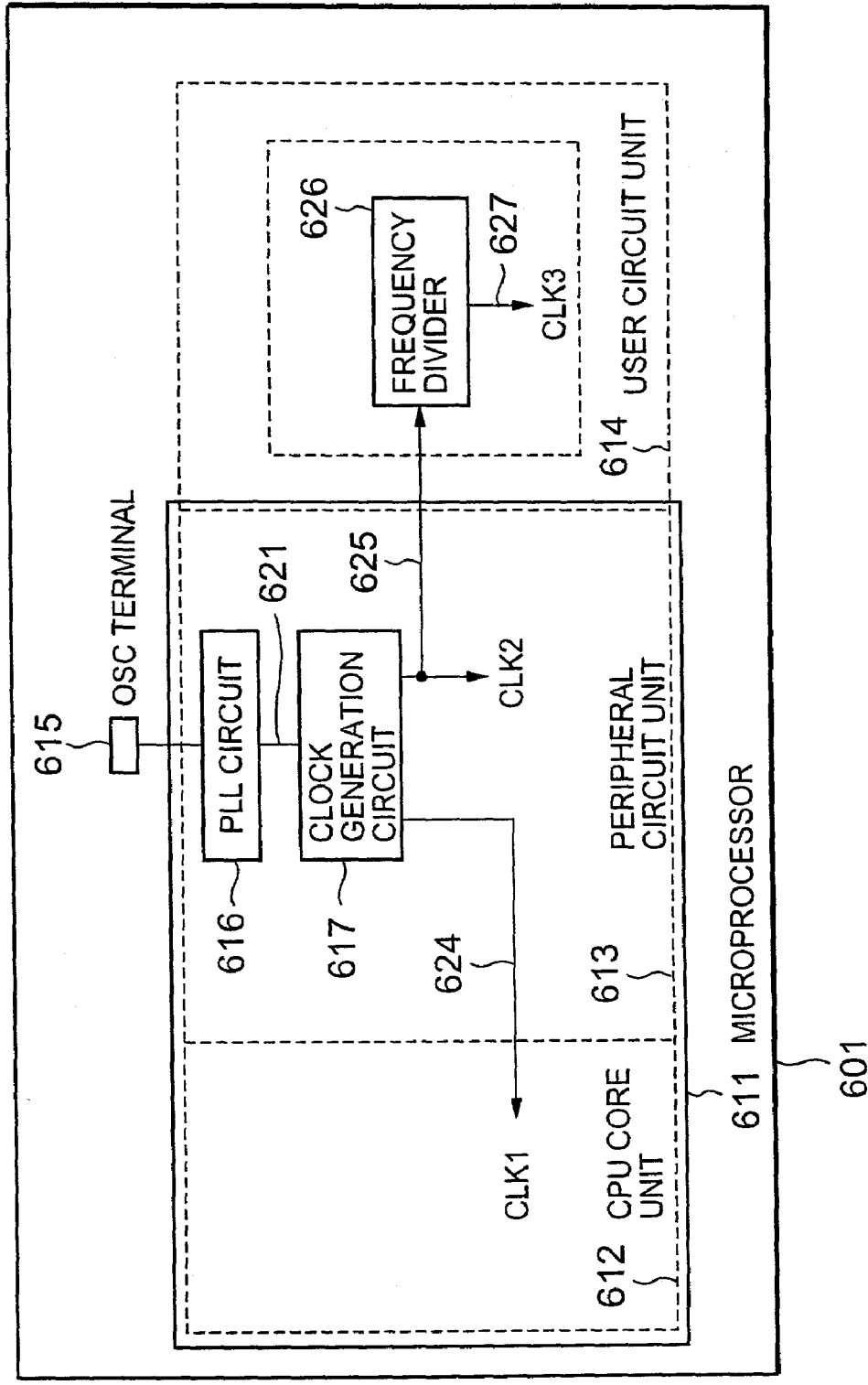
FIG. 8 is a block diagram of the clock distribution circuit of the ASIC.

FIG. 8 shows the configuration of the ASIC in the third prior art. By referring to FIG. 8, the ASIC in the third prior art is based on the clock distribution configuration in a microprocessor 611 comprising a CPU core unit 612 and its peripheral circuit unit 613.

In a clock distribution circuit 601 of the ASIC in the cell-based system obtained by combining the microprocessor 611 comprising the CPU core unit 612 and the peripheral circuit unit 613 with user circuit unit 614, a clock (CLK) generation circuit 617 in the microprocessor 611 generates a clock CLK 1 (624) for quick operation of the CPU core unit 612 and a clock CLK 2 (625) for slow operation of the peripheral circuit unit 613, distributes the clocks to the CPU core unit 612 and the peripheral circuit unit 613, and distributes the clock frequency CLK 2 (625) of the peripheral circuit unit 613 to the user circuit unit 614.

A frequency divider 626 for setting an appropriate frequency division ratio is provided in the user circuit unit 614 corresponding to the operation frequency of an internal circuit so that a clock CLK 3 (627) for a user circuit unit is distributed.

Figure 4:
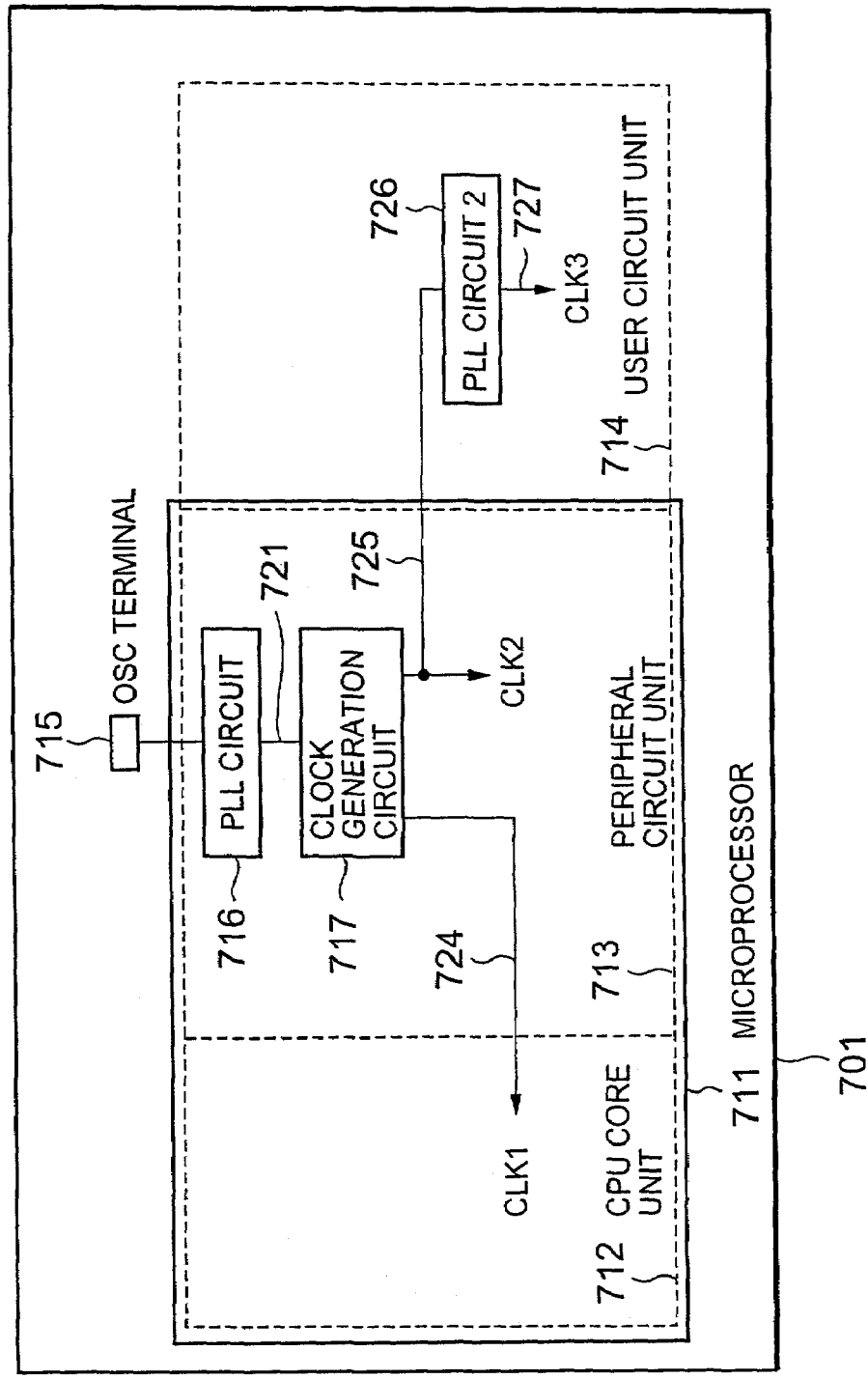
FIG. 4 is a block diagram of another conventional clock distribution circuit.

When the user circuit unit 614 is operating at a clock frequency higher than the clock frequency of the microprocessor 611 formed by the CPU core unit 612 and its peripheral circuit unit 613, the clock distribution circuit is configured by the example of the configuration shown in FIG. 4.

By referring to FIG. 4, in the ASIC in the third prior art, a clock (CLK) generation circuit 717 in a microprocessor 711 comprising a CPU core unit 712 and its peripheral circuit unit 713 generates a clock CLK 1 (724) for quick operation of the CPU core unit 712 and a clock CLK2 (725) for slow operation of the peripheral circuit unit 713, and distributes them respectively to the CPU core unit 712 and the peripheral circuit unit 713, and the clock frequency CLK 2 (725) distributed from the microprocessor 711 is connected to a PLL circuit (727) configured by a user circuit unit 714.

Figure 5:
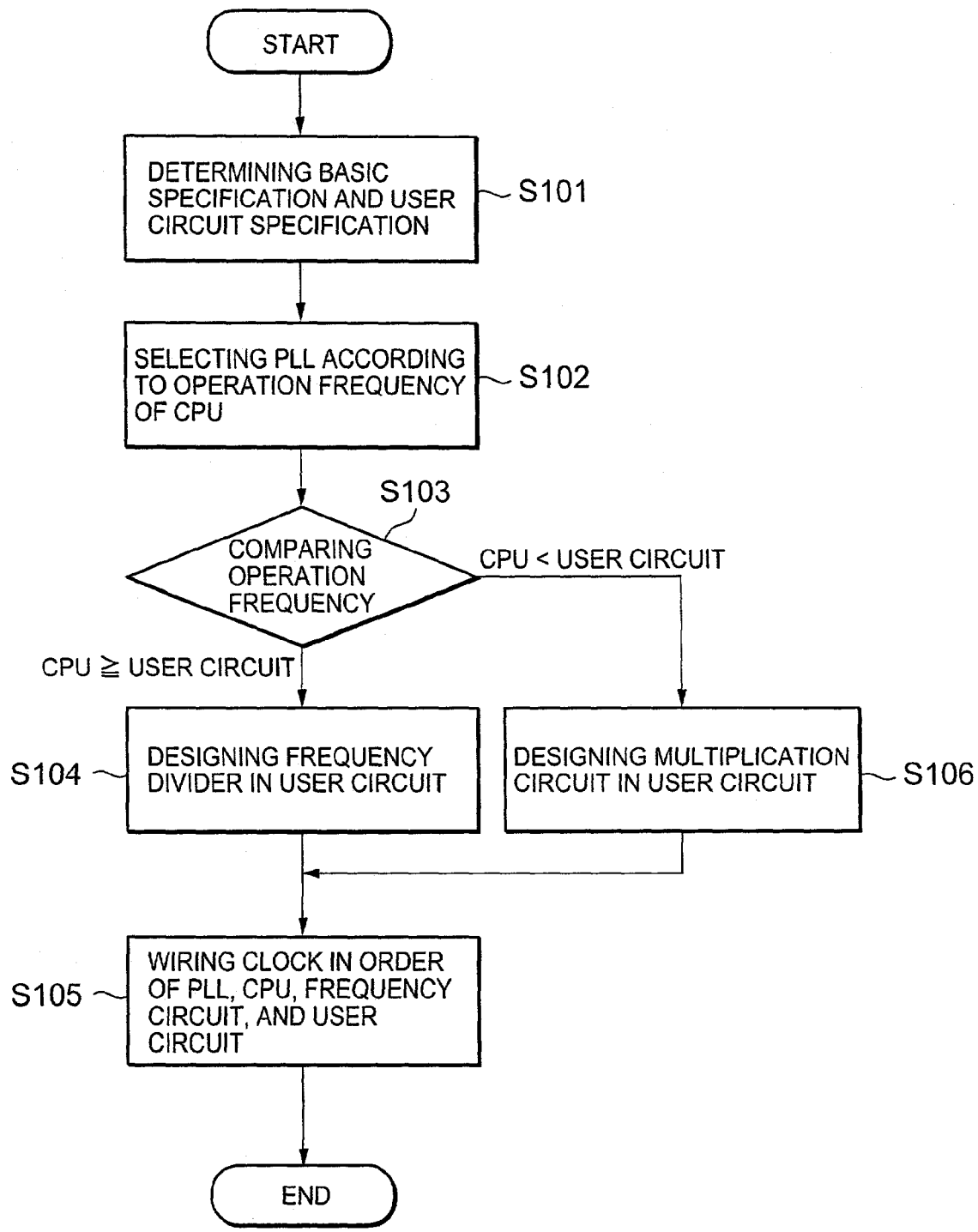
FIG. 5 is a flowchart of the design of a conventional ASIC.

Then, a design flow used when a clock distribution circuit of the ASIC according to the third prior art is designed will be described below by referring to FIG. 5.

In step S101, the specification of a product required by a user is determined. Required functions and operation speed are determined in this step.

In step S102, a PLL is selected. In some PLLs provided corresponding to each output frequency, an operation frequency corresponding to the CPU core unit is selected.

In step S103, the operation frequency of the CPU core unit in the product is compared with the maximum operation frequency of the user circuit unit. If the operation frequency of the CPU core unit is lower than the maximum operation frequency of the user circuit unit, then control is passed to step S106. Otherwise, control is branched to step S104.

In step S104, a frequency divider is designed in the user circuit. According to the specification determined in step S101, the frequency divider is designed to obtain an appropriate frequency division ratio from the output frequency of the PLL and the operation frequency of the user circuit unit.

In step S105, wiring is installed on the clock. In the clock wiring, the output of the PLL is received by the CPU core unit, then frequency-divided by the frequency divider designed in step S104, and is input into the user circuit unit.

In step S106, the second PLL circuit is designed in the user circuit unit. According to the specification determined in step S101, the second PLL circuit is designed to obtain an appropriate multiplication ratio from the output frequency of the PLL and the maximum operation frequency of the user circuit unit.

The operations performed in the method of designing the clock distribution circuit in the third prior art will be described below by referring to FIGS. 5, 8, and 4.

FIG. 8 shows the state of the clock wiring when the operation frequency of the CPU core unit is 18.4 MHz and the operation frequency of the user circuit unit is 9.2 MHz in the conventional designing method. When the designing process is performed according to FIG. 5, a PLL 616 having a frequency of 18.4 MHz is selected according to the operation frequency of the CPU core unit (step S102). Since the operation frequency of the CPU core unit is equal to or higher than (≧) the maximum operation frequency of the user circuit unit, the frequency divider 626 is designed in the user circuit unit 614 (step S104). The CLK generation circuit 617 generates the CPU clock 624 and the peripheral circuit unit clock 625 based on a clock 621 output from the PLL 616. The wiring is installed such that the clock 624 can be provided for the CPU core unit 612, the clock 625 can be frequency-divided by the frequency divider 626, and the clock can be provided for the user circuit unit 614 (step S105).

FIG. 4 shows the state of the clock wiring when the operation frequency of the CPU core unit is 18.4 MHz and the frequency of the user circuit unit is 294.4 MHz in the conventional designing method. A PLL 716 having 18.4 MHz is selected according to the operation frequency of the CPU core unit (step S102). Since the operation frequency of the CPU core unit is lower (<) than the operation frequency of the user circuit unit, a second PLL circuit 726 is designed in the user circuit unit 714 (step S106). The CLK generation circuit 717 generates the CPU clock 724 and the peripheral circuit unit clock 725 based on a clock 721 output from the PLL 716. The wiring is installed such that the clock 724 can be provided for the CPU core unit 712, the clock 725 can be multiplied by 16 by the second PLL circuit 726, and can be provided for the user circuit unit 714 (step S105).

When the operation frequency of the CPU core unit is the same as the maximum operation frequency of the user circuit unit, the frequency divider is designed in the user circuit according to the flowchart. However, in this case, the frequency division ratio is 1/1 which practically indicates no frequency division.

Therefore, there can be no frequency divider only in this case. In addition, the operation frequency of the user circuit unit designed by function is not limited to a unique value. When there are a plurality of operation frequencies in a mixed manner, the maximum frequency is provided for the user circuit unit, and is frequency-divided and distributed as necessary in the user circuit (not shown in the attached drawings).

The embodiments of the present invention will be described below by referring to the attached drawings.

In the clock distribution circuit according to the present invention, the clock frequency output from the PLL circuit in the microprocessor macro unit comprising a CPU core and its peripheral circuit is distributed directly to the user circuit unit, and the clock frequency distributed to the user circuit unit is distributed to the microprocessor macro unit comprising the CPU core and its peripheral circuit through the frequency divider corresponding to the frequency control unit configured by the user circuit unit, thereby realizing an ASIC in the gate array system obtained by combining the microprocessor macro comprising a CPU core and its peripheral circuit with the user circuit. Thus, the user circuit can be operated at a clock frequency higher than the clock frequency of the microprocessor macro unit comprising the CPU core and its peripheral circuit without configuring a PLL circuit in the user circuit unit. As a result, all of user circuit units whose sizes are predetermined can be used in the user circuit of a client.

First, by referring to the attached drawings, the clock distribution circuit according to a first embodiment of the present invention will be described below.

Figure 6:
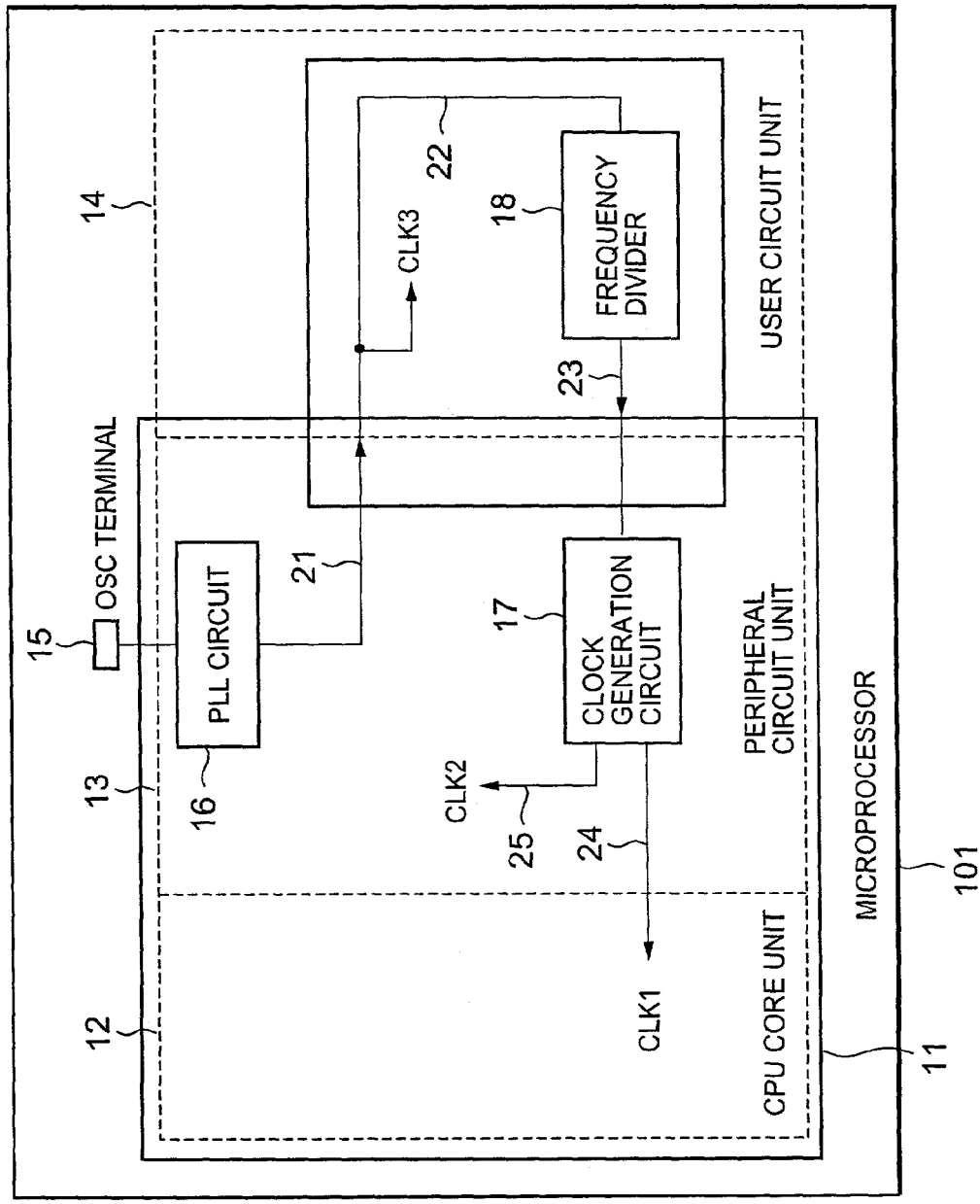
FIG. 6 is a block diagram of a clock distribution circuit according to a first embodiment of the present invention.

FIG. 6 shows a configuration of the clock distribution circuit according to the first embodiment of the present invention.

In FIG. 6, a clock distribution circuit 101 according to the first embodiment of the present invention distributes a clock frequency 21 output from a PLL circuit 16 in a microprocessor macro unit 11 as a CLK 3 (22) directly to a user circuit unit 14.

Then, the clock distribution circuit 101 according to the first embodiment of the present invention redistributes to the microprocessor macro unit 11 a clock frequency 23 obtained by frequency-dividing the clock frequency 22 distributed to the user circuit unit 14 through a frequency divider 18 corresponding to the frequency control unit configured by the user circuit unit 14.

Furthermore, the clock distribution circuit 101 according to the first embodiment of the present invention receives the clock frequency 23, distributes it to a CPU core unit 12 as a CLK 1 (24) and to a peripheral circuit unit 13 as a CLK 2 (25) by a clock generation circuit 17.

With the configuration, when the clock frequency of the client-desired user circuit unit higher than the clock frequency of the microprocessor macro unit can be realized in the PLL circuit of the microprocessor macro unit without configuring the PLL circuit in the user circuit unit 14, the user circuit unit at the user-desired clock frequency higher than the clock frequency of the microprocessor macro unit can be successfully operated.

The frequency divider 18 can also be configured by two stages of well-known flip-flops.

In practically explaining the above mentioned examples of circuits, in a product for a client, the clock frequency output of the PLL circuit of the microprocessor macro unit comprising a CPU core and its peripheral circuit is 73.6 MHz, the user circuit unit is operated at the clock frequency of 73.6 MHz, the clock frequency of 18.4 MHz, which is ¼ of the clock frequency of the user circuit unit, is distributed to the microprocessor macro unit with a quarter frequency divider configured in the user circuit unit, thereby operating the microprocessor macro unit at the clock frequency of 18.4 MHz.

As described below, Table 1 shows the results from the clock frequency.

TABLE 1

| PLL | User circuit clock frequency | Microprocessor clock frequency |
|---|---|---|
| 73.6 MHz | 73.6 MHz | 18.4 MHz |

Described below will be the ASIC in the gate array system to which the clock distribution circuit according to the first embodiment of the present invention is applied.

Figure 7:
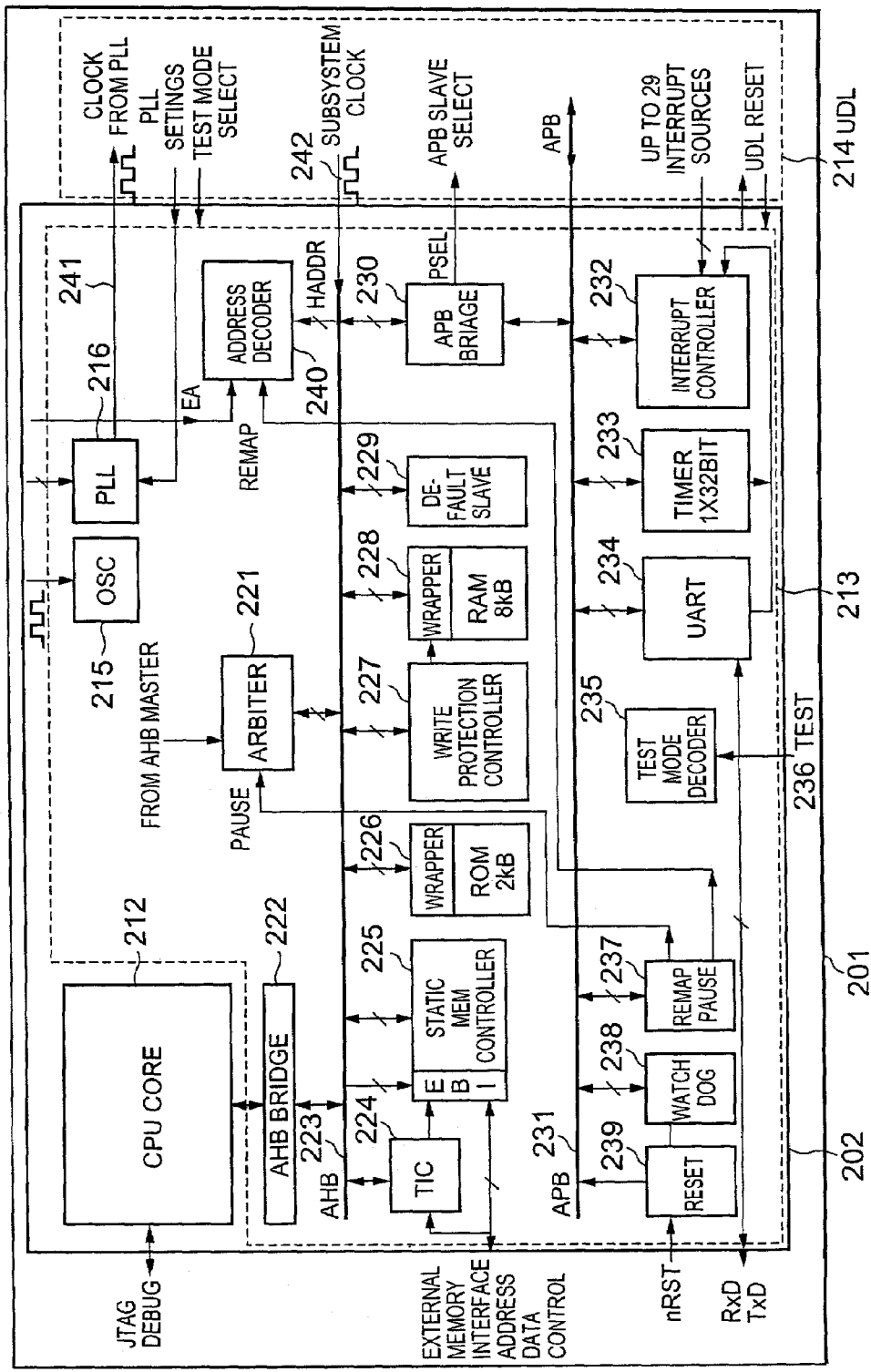
FIG. 7 is a block diagram of an ASIC including the clock distribution circuit according to the first embodiment of the present invention.

FIG. 7 shows the configuration of the ASIC, including the clock distribution circuit according to the first embodiment of the present invention, in the gate array system obtained by combining a microprocessor macro comprising a CPU core and its peripheral circuit with a user circuit.

An ASIC 201 in the gate array system will be described below by referring to FIG. 7. In FIG. 7, the ASIC 201 in the gate array system has a configuration in which a microprocessor macro 202 comprising a CPU core 212 and its peripheral circuit 213 is combined with a user circuit 214.

In more detail, the CPU core 212 of the ASIC 201 is a 32-bit reduced instruction set computer (hereinafter abbreviated as RISC).

The instruction set of the CPU core has the code density more excellent than the pure RISC by maintaining the important features of the CISC based on the RISC concept.

Therefore, the CPU core 212 is a core of a small chip area with high power efficiency by combining simple hardware with the instruction.

Additionally, the peripheral circuit 213 of the ASIC 201 has two buses, that is, a bus for high-speed data transfer (hereinafter abbreviated as AHB) 223 and a bus for low-speed data transfer (hereinafter abbreviated as APB) 231.

Furthermore, the user circuit unit 214 of the ASIC 201 is connected to the APB 231, and has an area configured by a gate array.

The configuration of the peripheral circuit 213 of the ASIC 201 will be described below in more detail. The peripheral circuit 213 of the ASIC 201 is provided with an oscillator 215 for generating a clock signal for use by the ASIC 201 and a programmable PLL 216.

The peripheral circuit 213 of the ASIC 201 comprises an AHB bridge 222 for bridging the CPU core 212 and the AHB 223, and a test interface controller (hereinafter abbreviated as TIC) 224 for mainly testing the CPU core 212.

The peripheral circuit 213 of the ASIC 201 further comprises memory controller 225 for transmission/reception of a signal to and from the AHB 223, ROM 226 of 2 KB, a write-protection controller 227, RAM 228 of 8 KB, a default slave 229, an APB Bridge 230, and an address decoder 240.

The peripheral circuit 213 of the ASIC 201 comprises a RESET 239 for transmission/reception of a signal to and from an APB bus, a WATCH DOG 238, a Remap Pause 237, a UART 234, a TIMER 233 having two 32-bit down counters, and an interrupt controller 232.

The interrupt controller 232 supports 32 interrupt levels. The 28 interrupt levels are from the UDL 214, and the four interrupt levels are from the peripheral circuit 213 of the ASIC 201.

The priority of the 32 interrupts is controlled by the IRQ or the FIRQ of the CPU core 212 of the ASIC 201, can be individually or collectively masked or selected.

Then, the peripheral circuit 213 of the ASIC 201 comprises a test mode decoder 235 for setting a test mode for the entire ASIC 201 when the microprocessor macro 202 comprising the CPU core 212 and the peripheral circuit 213 is tested.

When the ASIC in the gate array system to which the clock distribution circuit according to the first embodiment of the present invention is applied is explained, the CPU core is defined as a RISC type CPU, but the CPU core can be a CPU of a CISC type.

Described below will be the case in which the clock distribution circuit according to the first embodiment of the present invention is applied to the ASIC 201 shown in FIG. 7.

When the clock distribution circuit according to the first embodiment of the present invention is applied to the ASIC 201 shown in FIG. 7, the PLL 216 shown in FIG. 7 corresponds to the PLL circuit 16 shown in FIG. 6, and a clock 241 corresponds to the CLK 3 (21) in the clock distribution circuit according to the first embodiment of the present invention.

Then, the frequency divider circuit (not shown in the attached drawings) corresponding to the frequency divider 18 is configured in the UDL 214. Additionally, the subsystem clock 241 corresponds to the output 23 of the frequency divider 18.

In addition, the clock distribution circuit corresponding to the CLK generation circuit 17 is configured inside the APB Bridge 230 although it is not shown in the attached drawings.

Another embodiment of the present invention will be described below by referring to the attached drawings.

The case of distributing a clock signal of the clock distribution circuit 101 according to the first embodiment of the present invention will be described below as a method of designing a clock of the clock distribution circuit according to a second embodiment of the present invention.

Figure 9:
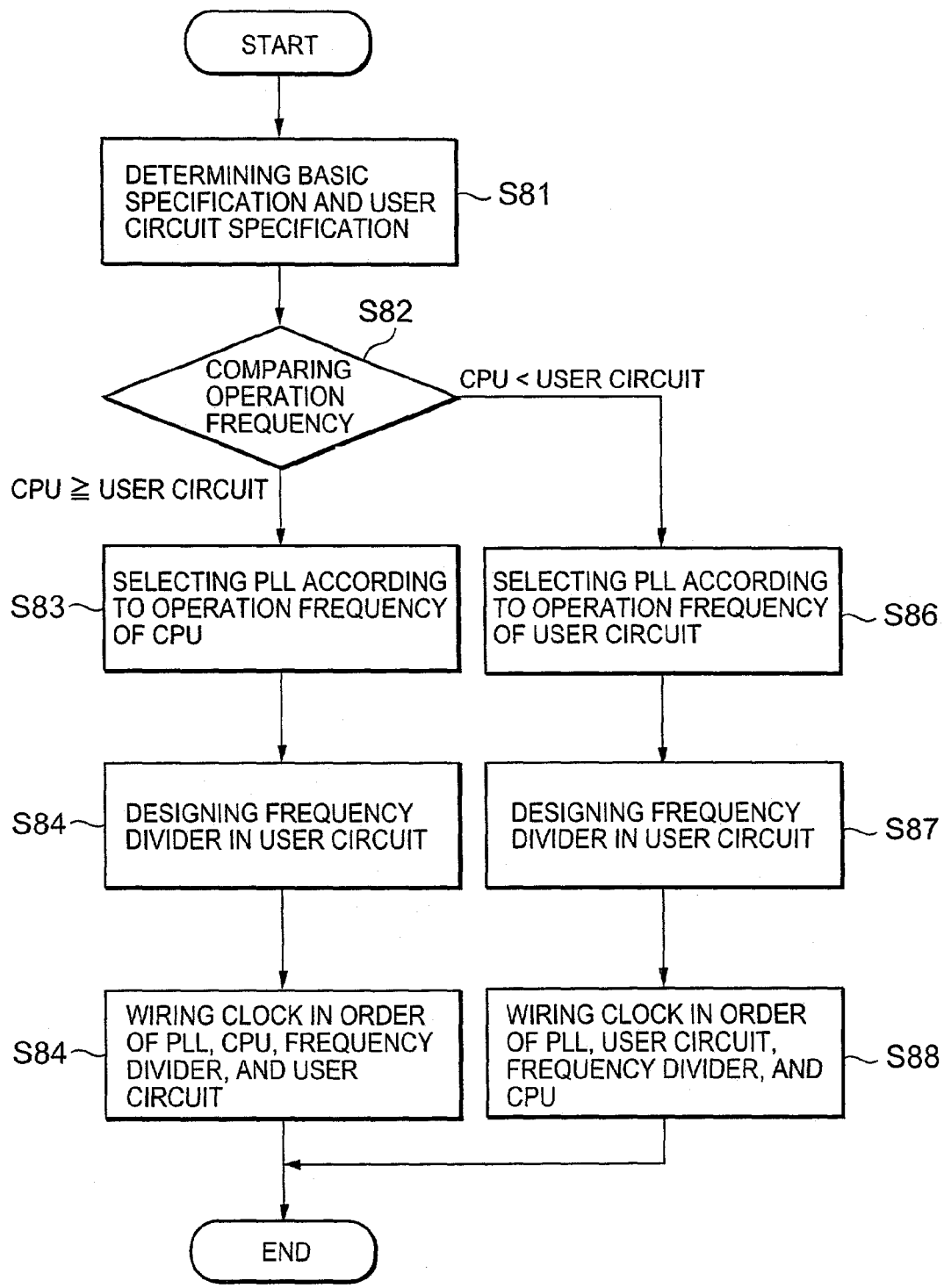
FIG. 9 is a flowchart of a design of an ASIC according to a second embodiment of the present invention.

FIG. 9 is a flowchart of a method of designing a clock distribution circuit according to a second embodiment of the present invention.

In step S81, the specification of a user-required product is determined. A necessary function, an operation frequency, etc. can be determined. In step S82, the operation frequency of the CPU core unit in this product is compared with the maximum operation frequency of the user circuit unit. If the operation speed of the CPU core unit is lower than that of the user circuit unit, then control is passed to step S86. Otherwise, control is branched to step S83.

In step S83, a PLL is selected. In some PLLs provided depending on the output frequency, a PLL corresponding to the operation frequency of the CPU core unit is selected here. In step S84, a frequency divider is designed in the user circuit unit. According to the specification determined in step S81, the designing process is performed such that an appropriate frequency division ratio can be obtained from the output frequency of the PLL and the maximum operation frequency of the user circuit unit.

In step S85, clock wiring is installed. The clock wiring is carried out such that the output of the PLL can be received by the CPU core unit, then frequency-divided by the frequency divider designed in step S84, and input into the user circuit unit.

In step S86, a PLL is selected. Unlike in step S83, a PLL is selected according to the maximum operation frequency of the user circuit unit. In step S87, a frequency divider is designed in the user circuit unit.

According to the specification determined in step S81, the designing process is performed such that an appropriate frequency division ratio can be obtained from the output frequency of the PLL and the operation frequency of the CPU core unit. Instep S88, clock wiring is installed. The clock wiring is performed such that the output of the PLL is received by the user circuit unit, then frequency-divided by the frequency divider designed in step S87, and input into the CPU core unit and the peripheral circuit unit.

In FIG. 9, the method of designing the clock wiring according to the second embodiment of the present invention can be a process (step S81) of determining the specification of a product, and a process (step S82) of comparing the operation frequency between the CPU and the user circuit. If the operation frequency of the CPU is equal or higher than the maximum operation frequency of the user circuit, then the process (step S83) of selecting a PLL according to the operation frequency of the CPU is designed, the process (step S84) of designing a frequency divider inside the user circuit is performed, and then the process (step S85) of clock wiring is designed. If the operation frequency of the CPU is lower than the maximum operation frequency of the user circuit in the comparison in step S82, then the process (step S86) of selecting a PLL according to the maximum operation frequency of the user circuit is designed, the process (step S87) of designing a frequency divider inside the user circuit is performed, and then the process (step S88) of clock wiring is designed.

FIG. 6 shows the clock wiring when the operation frequency of the CPU is 18.4 MHz, and the maximum operation frequency of the user circuit is 73.6 MHz. Since the operation frequency of the CPU is lower than (<) the operation frequency of the user circuit, the PLL circuit 16 of 73.6 MHz is selected according to the maximum operation frequency of the user circuit unit 14 (step S86).

Then, the frequency divider 18 is designed inside the user circuit unit 14 (step S87). The wiring is carried out such that the clock 21 output from the PLL circuit 16 can be provided for the user circuit unit 14 and quartered by the frequency divider 18, and the clock 23 can be generated and provided for the CLK generation circuit 17 (step S88). The CLK generation circuit 17 generates the clock 24 for the CPU core unit and the clock 25 for the peripheral circuit unit.

FIG. 8 shows the clock wiring when the operation frequency of the CPU core unit is 18.4 MHz and the maximum operation frequency of the user circuit unit is 9.2 MHz. In this case, since the same result as the prior art is output, only different portions will be described below.

When the designing process is performed by referring to FIG. 9, the operation frequency of the CPU core unit is equal to or higher than ($\geq$) the maximum operation frequency of the user circuit unit. Therefore, the PLL 616 of 18.4 MHz is selected according to the operation frequency of the CPU core unit (step S83). Next, a frequency divider 626 is designed in a user circuit 614 (step S84). The wiring is carried out such that the clock 621 output from the PLL 616 can be provided for the CLK generation circuit 617 and frequency-divided by the frequency divider 626, and the clock 627 for the user circuit unit can be generated and provided for the user circuit 614 (step S85).

When the operation frequency of the CPU is the same as the maximum operation frequency of the user circuit, the frequency divider is designed in the user circuit according to the flowchart. However, in this case, the frequency division ratio is 1/1 which practically indicates no frequency division. Therefore, there can be no frequency divider only in this case. In addition, the operation frequency of the user circuit designed by function is not limited to a unique value. When there are a plurality of operation frequencies in a mixed manner, the maximum frequency is provided for the user circuit, and is frequency-divided and distributed as necessary in the user circuit (refer to FIG. 10).

Then, the clock distribution circuit according to a third embodiment of the present invention will be described below by referring to FIG. 10.

Figure 10:
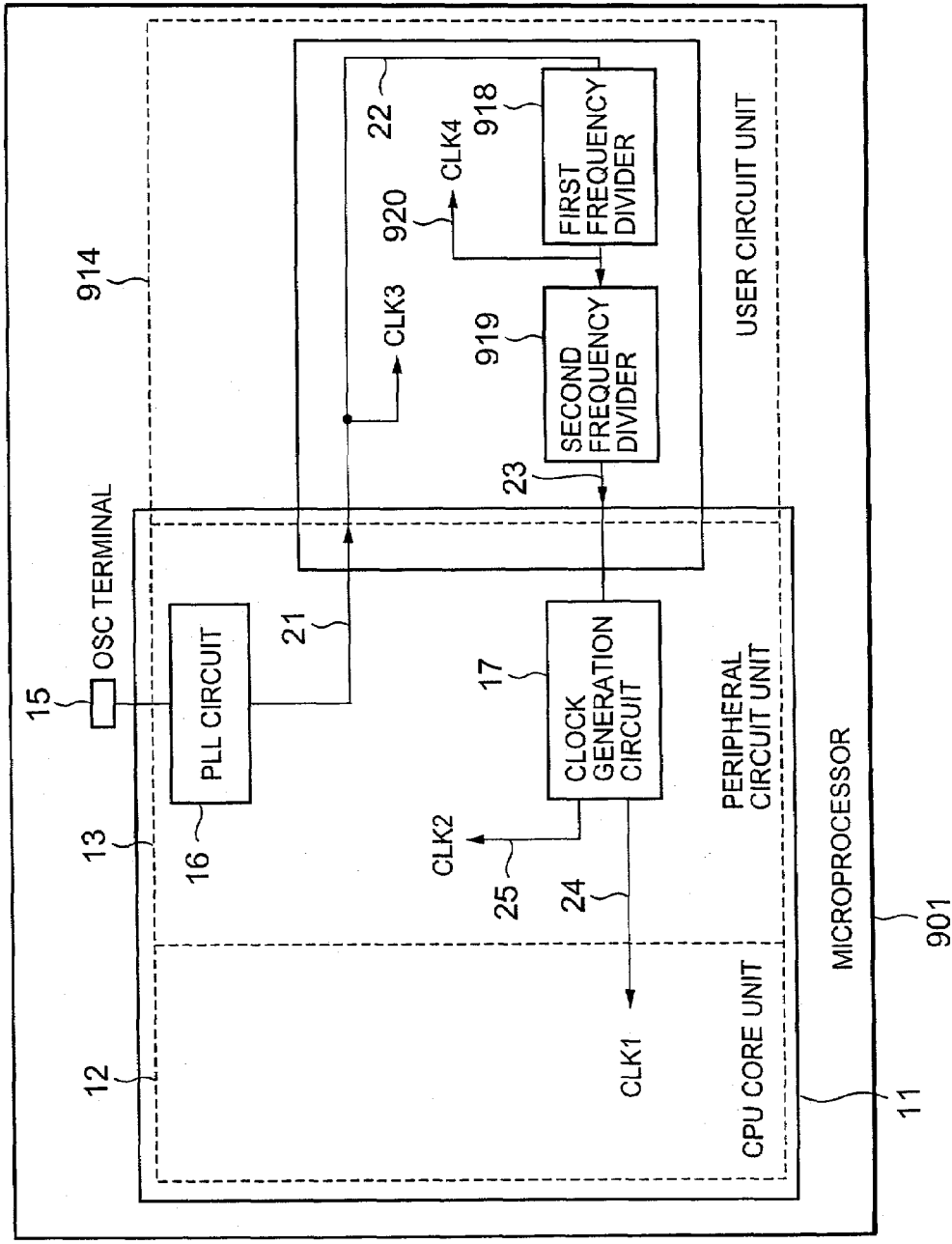
FIG. 10 is a block diagram of a clock distribution circuit according to a third embodiment of the present invention.

FIG. 10 shows a configuration of a clock distribution circuit according to a third embodiment of the present invention.

A clock distribution circuit 901 according to the third embodiment of the present invention is configured such that the clock frequency 22 distributed to the user circuit unit 914 can be frequency-divided by a first frequency divider 918 and a second frequency divider 919 corresponding to the frequency control unit configured by a user circuit unit 914 into the clock frequency 23 and redistributed to the microprocessor macro unit 11.

The clock distribution circuit 901 according to the third embodiment of the present invention sets the clock frequency 21, which is the output of the PLL circuit 16 of the microprocessor macro unit, at the frequency of the clock signal operating at the highest speed in the clock signals used in the ASIC in which the clock distribution circuit 901 according to the third embodiment of the present invention is used.

Practically, it is set at the maximum possible frequency in the production process for the product. For example, if the maximum possible frequency in the production process for the product is 294.4 MHz, then the output frequency of the PLL circuit 16 is 294.4 MHz. The user circuit unit 914 comprises the first quarter frequency divider 918 for receiving the clock frequency 21, which is the output of the PLL circuit 16, and the second quarter frequency divider 919 for receiving the output of the first quarter frequency divider 918.

The first quarter frequency divider 918 distributes to the user circuit unit 914 two types of frequencies, that is, the frequency (CLK 3) of the clock signal 22 of 294.4 MHz, which is the output of the PLL circuit 16 of the microprocessor macro unit 11, and the frequency (CLK 4) of a clock signal 920 of 73.6 MHz, which is ¼ clock frequency of the frequency (CLK 3) of the clock signal 22. The user circuit unit 914 is operated at the clock frequencies of 294.4 MHz and 73.6 MHz.

Upon receipt of the output of the first quarter frequency divider 918, the second quarter frequency divider 919 quarters the clock frequency (CLK 4) of 73.6 MHz, and outputs the clock signal 23 of 18.4 MHz which is a ¹⁄₁₆ of the clock frequency of the user circuit unit 914.

Then, the clock signal 23 is distributed to the microprocessor macro unit 11, and the microprocessor macro unit 11 operates at the clock frequency of 18.4 MHz.

That is, the user circuit unit 914 is provided with the first quarter frequency divider 918 and the second quarter frequency divider 919 so that two types of clock frequencies, that is, 294.4 MHz and 73.6 MHz, which is ¼ of the clock frequency of the PLL circuit of the microprocessor macro unit, can be distributed.

Each of the first quarter frequency divider 918 and the second quarter frequency divider 919 is configured by two stages of well-known flip-flops.

In the description above, the number of stages of the flip-flops of the first quarter frequency divider 918 is set equal to that of the second quarter frequency divider 919, but can be different from it.

As in the case in which the clock distribution circuit according to the first embodiment of the present invention is applied, when the clock distribution circuit according to the third embodiment of the present invention is applied to the ASIC 201 shown in FIG. 7, the PLL 216 shown in FIG. 7 corresponds to the PLL circuit 16 shown in FIG. 10, and the clock 241 corresponds to the CLK3 (21) as the clock distribution circuit according to the third embodiment of the present invention.

The frequency dividers (not shown in the attached drawings) corresponding to the first quarter frequency divider 918 and the second quarter frequency divider 919 are configured in the UDL 214.

Furthermore, as in the case in which the clock distribution circuit according to the first embodiment of the present invention is applied, the subsystem clock 241 corresponds to the output 23 of the second quarter frequency divider 919.

Although the clock generation circuit corresponding to the CLK generation circuit 17 not shown in the attached drawings is also configured in the APE Bridge 230 as in the clock distribution circuit according to the first embodiment of the present invention.

When the ASIC in the gate array system to which the clock distribution circuit according to the third embodiment of the present invention is applied is explained above, the CPU core is an RISC type CPU. However, the CPU core can also be a CISC type CPU as in the case of the ASIC in the gate array system to which the clock distribution circuit according to the first embodiment of the present invention is applied.

The method of designing the clock distribution circuit 901 according to the third embodiment of the present invention is the same as the method of designing the clock distribution circuit 101 according to the first embodiment of the present invention. Therefore, the detailed explanation of the designing method is omitted here.

As described above, according to the present invention, in a product of the gate array system obtained by combining the microprocessor macro comprising a CPU core and its peripheral circuit with the user circuit, a user circuit unit can be operated at a clock frequency higher than the clock frequency of a microprocessor macro unit comprising a CPU core and its peripheral circuit without configuring the PLL circuit in the user circuit unit. Therefore, the user circuit unit whose number of gates is predetermined can be used in a client-desired user circuit, thereby avoiding the problem that the client-desired user circuit cannot be realized in the user circuit unit.

For example, the clock frequency which is the output of the PLL circuit of the microprocessor macro unit comprising a CPU core and its peripheral circuit is 73.6 MHz, the user circuit unit is operated at the clock frequency of 73.6 MHz, the user circuit unit is provided with a quarter frequency divider, and the clock frequency of 18.4 MHz, which is ¼ of the clock frequency of the user circuit unit, is distributed to the microprocessor macro unit, thereby operating the microprocessor macro unit at the clock frequency of 18.4 MHz.

What is claimed is:

1. A system-on-chip comprising thereon a microprocessor and a user circuit, said microprocessor operating on a first clock signal and including a PLL circuit that has been originally provided for a purpose of generating a clock signal for said microprocessor, said user circuit operating on a second clock signal that is greater in frequency than said first clock signal, said PLL circuit being thereby designed to generate and supply said second clock signal to said user circuit, said user circuit including a frequency divider that is supplied with said second clock signal and produces and supplies said first clock signal to said microprocessor in place of said PLL circuit.

2. The system-on-chip as claimed in claim 1, wherein said system-on-chip has on a semiconductor chip first and second areas apart from each other, a CPU core unit and said PLL circuit being arranged in said first area as said microprocessor, and said user circuit being arranged in said second area together with said frequency divider, said system-on-chip further having on said semiconductor chip a first wiring layer extending from said first area to said second area to convey said second clock signal from said PLL circuit to said frequency divider and a second wiring layer extending from said second area to said firs; area to convey said first clock signal from said frequency divider to said CPU core unit.

3. The system-on-chip as claimed in claim 1, said microprocessor further including a CPU core unit, a peripheral circuit unit and a clock generator circuit, said clock generator circuit receiving said first clock signal and generating first and second internal clocks that are supplied respectively to said CPU core unit and said peripheral circuit unit.

4. The system-on-chip as claimed in claim 3, wherein said frequency divider is divided into first and second dividers, said first divider receiving said second clock signal and producing a third internal clock that is used for said user circuit, said second divider receiving said third internal clock and producing said first clock signal.

5. A method for designing a system-on-chip in which a user circuit is combined with a microprocessor, said microprocessor being equipped with a clock generator, said method comprising:

comparing in frequency a first clock signal required for said user circuit with a second clock signal required for said microprocessor;

controlling said clock generator to generate said first clock signal when said first clock signal is greater in frequency than said second clock signal irrespective of said clock generator being dedicated to said microprocessor;

providing a frequency control unit into said user circuit that receives said first clock signal and generates said second clock signal; and electrically connecting an output of said clock generator to said frequency control unit and an output of said frequency control unit to said microprocessor.

6. The method as claimed in claim 5, wherein said clock generator comprises a PLL circuit and said frequency control unit comprises a frequency divider.

* * * * *